United States Patent [19]

Stolzer

[11] Patent Number: 4,823,662
[45] Date of Patent: Apr. 25, 1989

[54] APPARATUS FOR HANDLING BAR-LIKE WORKPIECE MATERIAL IN A SAWING MACHINE

[75] Inventor: Armin Stolzer, Renchen, Fed. Rep. of Germany

[73] Assignee: Keuro Maschinenbau GmbH & Co., KG, Achern-Gamshurst, Fed. Rep. of Germany

[21] Appl. No.: 134,125

[22] Filed: Dec. 17, 1987

[30] Foreign Application Priority Data

Jan. 26, 1987 [DE] Fed. Rep. of Germany ....... 3702223

[51] Int. Cl.$^4$ .......................... B23D 47/04; B26D 7/02
[52] U.S. Cl. ........................................ 83/150; 83/153; 83/206; 83/277; 83/282; 83/477.2; 83/486.1
[58] Field of Search ................. 83/150, 153, 157, 101, 83/78, 206, 276, 277, 278, 282, 363, 365, 703, 432, 435, 471.3, 477.2, 473, 486.1

[56] References Cited

U.S. PATENT DOCUMENTS

| | | | |
|---|---|---|---|
| 4,018,118 | 4/1977 | Goff | 83/477.2 X |
| 4,252,040 | 2/1981 | Kiefer | 83/153 X |
| 4,342,240 | 8/1982 | Gaiser et al. | 83/153 X |
| 4,524,656 | 6/1985 | Del Fabro et al. | 83/153 X |
| 4,574,670 | 3/1986 | Johnson | 83/471.3 X |
| 4,669,348 | 6/1987 | Holder | 83/477.2 X |

FOREIGN PATENT DOCUMENTS 2816497 10/1983 Fed. Rep. of Germany .
2299947 9/1976 France ................. 83/477.2

*Primary Examiner*—Frank T. Yost
*Assistant Examiner*—Hien H. Phan
*Attorney, Agent, or Firm*—Edwin E. Greigg

[57] ABSTRACT

An apparatus for handling bar-like workpiece material in a sawing machine, in particular in the form of a miterbox saw, which has a clamping carriage that is disposed on the machine frame above the workpiece table and is movable horizontally and parallel to the feed direction of the workpiece material. On one workpiece side, the clamping carriage has two openable and closable bearing jaws, and facing them in the direction of the workpiece material it has three openable and closable clamping jaws disposed beside one another in the material feed direction. The openable and closing jaws are coordinated such that a stock material is held in place for sawing a measured piece and then the cut piece and stock material are moved together to a position for the nextcut length. The cut piece is then moved and released. The steps are repeated to cut the next and successive pieces.

23 Claims, 13 Drawing Sheets

APPARATUS FOR HANDLING BAR-LIKE WORKPIECE MATERIAL IN A SAWING MACHINE

BACKGROUND OF THE INVENTION

The invention relates to an apparatus for handling bar-like workpiece material in a sawing machine, in particular in a miter-box saw having a miter angle that is adjustable about an axis vertical to a workpiece table of a machine frame, such as a vertically extending band saw or circular cold saw having a saw blade rotatable about a horizontal axis. In such a machine, the saw blade is displaceable from below through a pivotable slit in the workpiece table. So that the material resting on the machine table and on a delivery apparatus, for instance in the form of a gravity-roller conveyor, that precedes the machine table, will be securely retained, a pair of immovably disposed, openable and closable clamping jaws is provided prior to the cutting plane, in terms of the feed direction of the material. One of these clamping jaws is disposed stationary in a vertical plane parallel to the material feed direction of the material, and in the vicinity of the cutting plane, a vertical clamping jaw is disposed on the machine in a vertically adjustable manner, so as to effect opening and closing, thereby clamping the material against the machine table during the cutting.

In saw machines of this kind, handling of the workpiece material presents problems, because of the variety of requirements involved. Not only must the workpiece material be advanced piece by piece by the length that is to be cut off, but the severed pieces of material must also be disposed of, in the course of which it may be necessary to sort them in various ways, yet without shortening the primary operating time of the cold saw more than absolutely necessary. Furthermore, in the miter-box saws in question, very short in-between pieces, produced when the miter angle is adjusted between two severing operations, must also be disposed of. Finally, care must be taken that the bar-like material can be processed with as little waste as possible, yet on the other hand that bar sections not used during the processing can be returned to the delivery apparatus and from there can be returned to storage until later use.

Another problem is that the saw chips that are produced must be stripped from the workpiece table, or its affected parts, as regularly as possible.

German Pat. No. 28 16 497 does disclose an apparatus having a pair of feed jaws that is displaceable in the material feed direction and is disposed following the cutting plane, as viewed in the material feed direction. The unprocessed material can be gripped anew by these feed jaws, passing through the cutting plane, and then fed while the pair of clamping jaws are open. At least shortly before the end of the severing cut, the feed jaws hold the piece of material that is to be severed, dispose of it in the material feed direction after the severing cut has been completed, and then return, so that passing through the cutting plane they can grasp the end of the material protruding beside the stationary pair of clamping jaws and effect the feeding of material, while the pair of clamping jaws open. This kind of operational sequence, however, means that the feeding of material, and hence from a timing standpoint the next severing cut, cannot take place until the previously severed piece of material is removed through the feed jaws and the feed jaws have returned to the vicinity of the cutting plane, which results in slower machine operation; that is, the portion of the primary operating time of the severing machine that is devoted to the severing work becomes shorter.

OBJECT AND SUMMARY OF THE INVENTION

Accordingly, an object of the invention is to disclose an apparatus for handling bar-like workpiece material in a sawing machine of the above-described type which integrally and hence in the most compact possible way contains all the means necessary for performing the above-described handling tasks that arise in miter-box saws, and which at the same time makes it possible to dispose of the severed pieces of material, on the one hand, and to feed the bar-like material for the next severing operation, at least for the most part without mutually restricting the time available.

The above object is attained in accordance with the invention in that a clamping carriage disposed above the machine frame is movable horizontally and parallel to the feed direction of the workpiece material, that the clamping carriage, in order to straddle the vertical clamping jaw—and thus to pass partially through the cutting plane—has a recess open toward the delivery side of the workpiece material. The depth of the recess allows the clamping carriage to be displaced as far as the pair of clamping jaws. Two horizontally openable and closable bearing jaws for the workpiece material are disposed beside one another in the material feed direction on the clamping carriage in said vertical plane and are spaced apart by a mutual distance allowing the passage therethrough of the saw blade over the adjustable range of the miter angle. The bearing jaws are openable and closable horizontally on the clamping carriage in the direction of the workpiece material via three clamping jaws for the workpiece material that cooperate with the bearing jaws and the bearing jaws are disposed beside one another in the material feed direction. The mutual spacing distance between the side edges oriented toward one another of the two outer clamping jaws is dimensioned such that for the largest possible cross section of the workpiece material, these outer clamping jaws are located outside the working range of the saw blade given a maximum miter angle.

With an apparatus having these characteristics, all the means necessary for handling the workpiece material are united in one structural unit, namely the clamping carriage, that is movable in the feed direction of the material. As a result, first, the workpiece material can be gripped even during the cutting, on both sides of the cutting plane, by the two outer clamping jaws, so that after the cut has been completed, a single motion of the clamping carriage makes it possible not only for the severed piece of material to be disposed of but also for the ensuing material for the next severing operation to be fed to the correct measure, by a pulling motion. Because the bearing jaws facing the two outer clamping jaws are also each openable and closable independently, it also becomes possible to release the severed piece of material and dispose of it in the course of the same clamping carriage motion, so that the next workpiece material can be fed still farther to the necessary extent, if the distance for disposing of the severed material is shorter than the distance by which the next workpiece material is to be fed for the next severing cut. On the other hand, it is equally possible for the next workpiece material to be released, in the course of this same clamping carriage motion, once it has been feed to the extent intended for the next severing cut, so that afterward the previously severed material can be advanced by a distance that is longer overall than the distance by which the next material is advanced for the next severing cut.

As soon as very short pieces, for instance in-between pieces that result from a changeover from one miter angle to another, are severed, these in-between pieces can be grasped by a middle one of three clamping jaws and ejected, in a manner comparable to that described above, along the feed path of the workpiece material for preparation of the next severing cut; once again, because separate opening and closing of the bearing jaws is possible, in-between pieces can be ejected either before or after the completion of the material feed for preparing for the next severing cut.

Because the cutting zone of the saw blade can be straddled by the clamping carriage at any time, until the clamping carriage and hence the clamping jaw and the associated bearing jaw located there arrive directly beside the stationary pair of clamping jaws, it also becomes possible to process the workpiece material down to the last still-usable remaining piece, because whenever the workpiece material is no longer gripped by the stationary pair of clamping jaws, this last remaining piece can finally be retained by the clamping means, attached to the clamping carriage, for the final severing operation. Conversely, because of these features of the handling apparatus it is also possible to slide relatively short but still usable remaining pieces of the workpiece material back to the delivery apparatus, from whence they can be returned to a magazine.

Hence the handling apparatus according to the invention is a compact structural unit, uniting all the necessary handling means within itself, so that a shared feed apparatus, along with the associated guide tracks and drive means is used for all the handling means. Correspondingly, the various courses of motion for the severed material, on the one hand, and the oncoming material, on the other, are unified with one another, which not only simplifies the apparatus and makes it less expensive in structural or engineering terms but also optimizes it in terms of the time required, that is, in terms of the utilization of the primary operating time of the machine.

The movement of the clamping jaws and bearing jaws can be generated hydraulically or pneumatically, in a known manner. The same applies to the feed motion of the clamping carriage, although for this element an electric motor drive, for example, is also possible. It is generally true of all the courses of motion that in the presently typical manner, they can proceed automatically, for example under a programmed control.

The vertical axis about which the miter angle is adjustable can suitably be disposed in the aforementioned vertical plane, which reduces the mutual spacing between the bearing jaws to a minimum. It is also advantageous that the bearing jaws extend in the feed direction of the workpiece material substantially over the entire extension of the clamping carriage in this direction and are of equal size; it is particularly advantageous if the bearing jaws extend at least over the entire extension of the clamping carriage.

The outer clamping jaws can protrude beyond the clamping carriage with their outer sides, so that in particular the clamping jaw facing the stationary pair of clamping jaws can more easily be moved until it is directly beside that pair.

The outer clamping jaws can also be made to be short in the material feed direction, so that then the middle clamping jaw can extend substantially over the entire distance between the outer clamping jaws and thus covers the conceivable cutting zone of the saw blade, so that any short severed pieces of material can be grasped well and securely.

A receiving table for severed workpiece material can also be located adjacent the workpiece table in the workpiece material feed direction, and the clamping carriage can be movable substantially over the entire length of the receiving table. From this receiving table, the severed workpiece material can be further handled in various ways; for example, it can be pushed away to the side whenever the clamping carriage has returned to the cold saw once again.

However, the receiving table may also be in the form of a tilting table actuatable in both directions transverse to the material feed direction, so that the severed workpiece material can be dumped into suitable receptacles, for example.

Finally, with the subject of the invention, a particularly advantageous and simple feature is the possibility of disposing a chip stripper, which can be put into contact with the workpiece table, on the end of the clamping carriage toward the material delivery side of the apparatus, outside the zone occupied by the workpiece material. The part of the chip stripper disposed on the side of the clamping carriage having the clamping jaws can be adjusted with the adjacent clamping jaw. It then becomes possible to clean the workpiece table automatically each time the clamping carriage executes a feed motion, and in particular after the completion of a severing operation, so that no further provision is needed and no particular attention need be devoted to this end.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
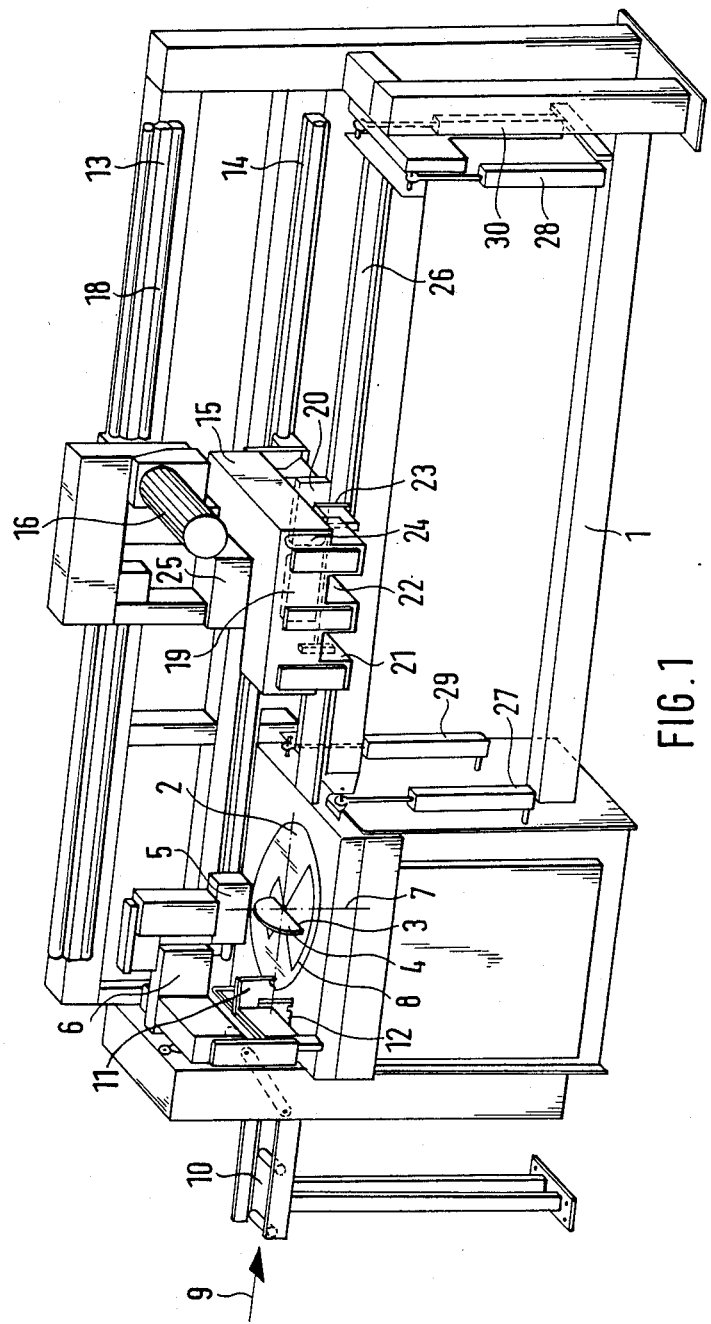
FIG. 1 is a perspective overall view of a cold saw of the type according to the invention.

The saw shown in FIGS. 1–4 has a machine frame 1 having a workpiece table 2 in the form of a turntable, through the slit 3 of which a saw blade 4 can be adjusted upward from below toward a vertical clamping jaw 5, for severing workpiece material in bar form, not shown. The vertical clamping jaw 5 is adjustable vertically on a holder 6 attached to the machine, and by means of this vertical clamping jaw 5 the workpiece material can be clamped to the workpiece table 2. The saw blade 4 is pivotable, together with the workpiece table 2, about a vertical axis 7 in the vicinity of an angle 8 and can be locked, in order to enable mitering of the workpiece material accordingly.

The workpiece material, not shown, is delivered to the saw via a gravity-roller conveyor 10 in the feed direction indicated by the arrow 9; during the cutting, the workpiece material is retained by a pair of clamping jaws 11, 12 that is stationary with respect to the feed direction 9. Here, the clamping jaw 11 is stationary and its face that comes into contact with the workpiece material is located in the same plane, parallel to the feed direction 9, as the vertical axis 7. Contrarily, the clamping jaw 12 is openable and closable transversely to the feed direction 9.

Figure 3:
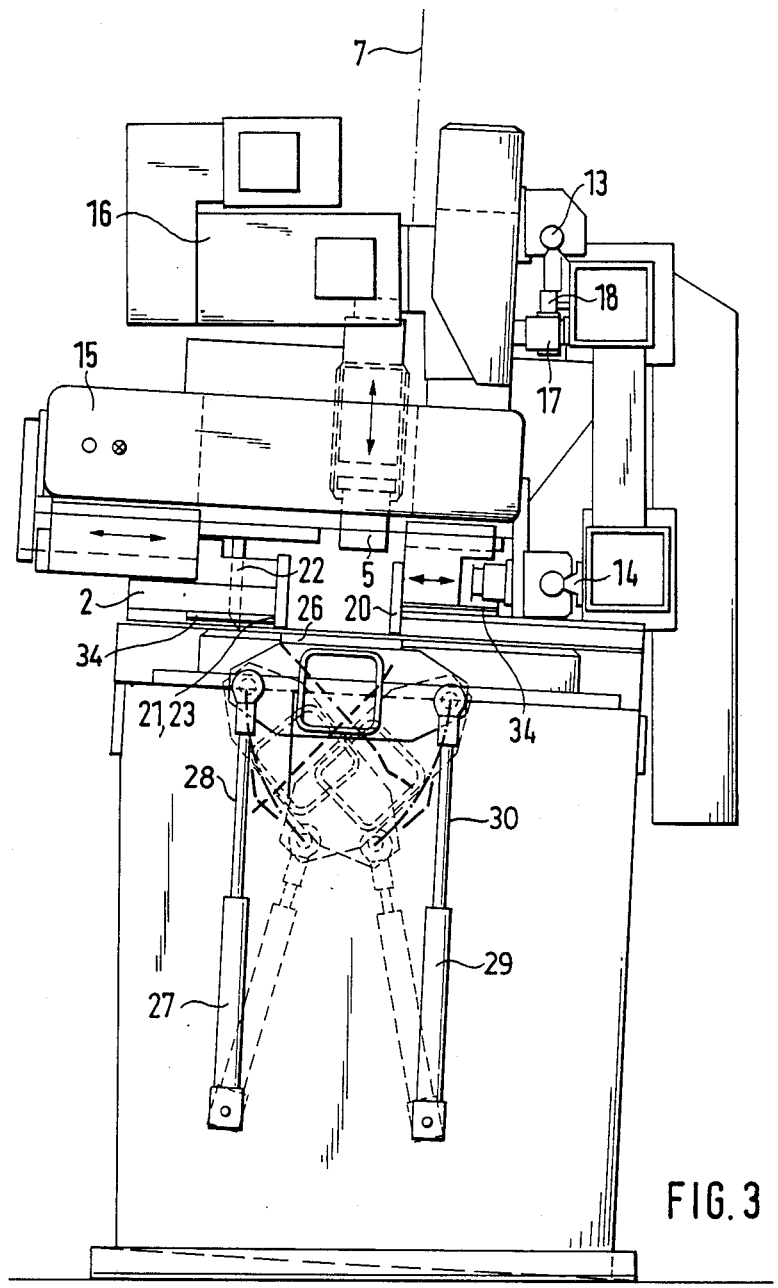
FIG. 3 shows the saw of FIG. 1 in the direction opposite the feed direction, that is, from the right as seen in FIG. 1, and again in a simplified illustration.

The machine frame 1 also has two guide tracks 13, 14 one above the other and parallel to the feed direction 9, along which tracks a clamping carriage 15 is movable with the aid of an electric motor 16, the pinion 17 of which, seen in FIG. 3, meshes with a rack 18 that is embodied on the guide track 13.

The clamping carriage 15 carries two bearing jaws 19, 20, which are openable and closable horizontally transversely to the feed direction 9, and the faces that come into contact with the workpiece material when the bearing jaws are closed are located in the same plane, parallel to the feed direction 9, as the vertical axis 7.

Facing the bearing jaws 19, 20 are clamping jaws 21-23, which are openable and closable horizontally, crosswise to the feed direction 9. With their outer side edges, the two outer clamping jaws 21, 23 protrude beyond the clamping carriage 15, as is also the case with respect to the outer edges of the bearing jaws 19 and 20.

Between their side edges oriented toward one another, the bearing jaws 19, 20 have a gap 24, which is enlarged in wedge-like fashion by the workpiece material in accordance with the miter angle and through which the saw blade 4 can pass as it executes a severing cut.

The clamping carriage 15 includes a recess 25, with which the carriage can straddle the vertical clamping jaw 5; the depth of the recess 25, viewed in the feed direction 9, is dimensioned such that the bearing jaw 19 and the clamping jaw 21 can move to directly beside the stationary pair of clamping jaws 11, 12.

Adjoining the workpiece table 2 in the feed direction 9 is a receiving table 26, which is embodied as a tilting table that can be pivoted about an axis parallel to the feed direction 9 by pairs of cylinder-piston units 27, 28 and 29, 30.

Figure 2:
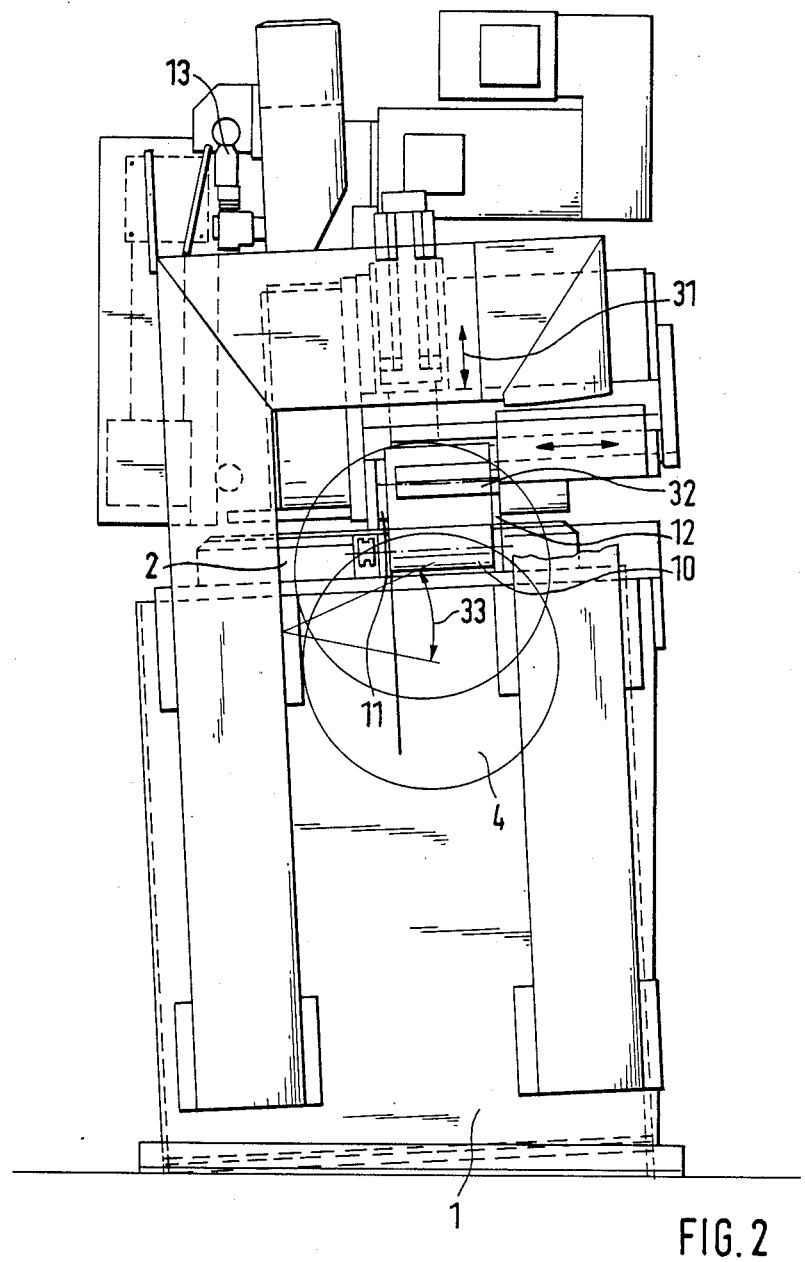
FIG. 2 shows the saw of FIG. 1 in the feed direction, that is, from the left as seen in FIG. 1, in a simplified illustration.

As shown in FIGS. 2 and 3, the saw is tilted somewhat toward the plane that is parallel to the feed direction 9 and that contains the vertical axis 7; thus this plane can be considered a secure bearing plane for the workpiece material.

FIG. 2 also shows a pressure roller 32, which is adjustable vertically as indicated by the double arrow 31 and precedes the pair of clamping jaws 11, 12 in the feed direction of the workpiece material and presses the workpiece material against the gravity-roller conveyor 10. With the double arrow 33, FIG. 2 also illustrates the vertical pivotability of the saw blade 4, with its bearing and drive apparatus, which are not shown; it is understood that while the material is being fed the saw blade can be pivoted downward far enough that it no longer protrudes past the surface of the workpiece table 2. During the severing operation, on the other hand, the saw blade penetrates the material of the vertical clamping jaw 5, which to this end has a suitable, replaceable protrusion. However, these items are known per se for a miter-box cold saw of the type shown and need not be described in detail here.

FIG. 3 adds to what has been shown thus far by showing a chip stripper 34, in the form of a broom which is attached to the clamping carriage on the side toward the clamping jaws 11, 12, leaving space for the material to pass through, and which is moved over the workpiece table of the machine when the clamping carriage 15 executes feed movements. The portion of the chip stripper 34 located toward the clamping jaw 21 can be secured to the clamping jaw 21 and can be adjusted together with this clamping jaw 21 while the portion on the chip stripper opposite from the clamping jaw 21 is fixed on the clamping carriage 15 and thereby movable toward and away from clamping jaws 11 and 12.

FIG. 4 once again shows the various clamping jaws and bearing jaws, clearly indicating their horizontal adjustability by the double arrows. This figure also shows that the clamping jaws 21, 23 are embodied as relatively narrow and are disposed such that they cannot come into contact with the saw blade. The clamping jaw 22 is correspondingly wide and covers the entire cutting zone of the saw blade.

Figure 4:
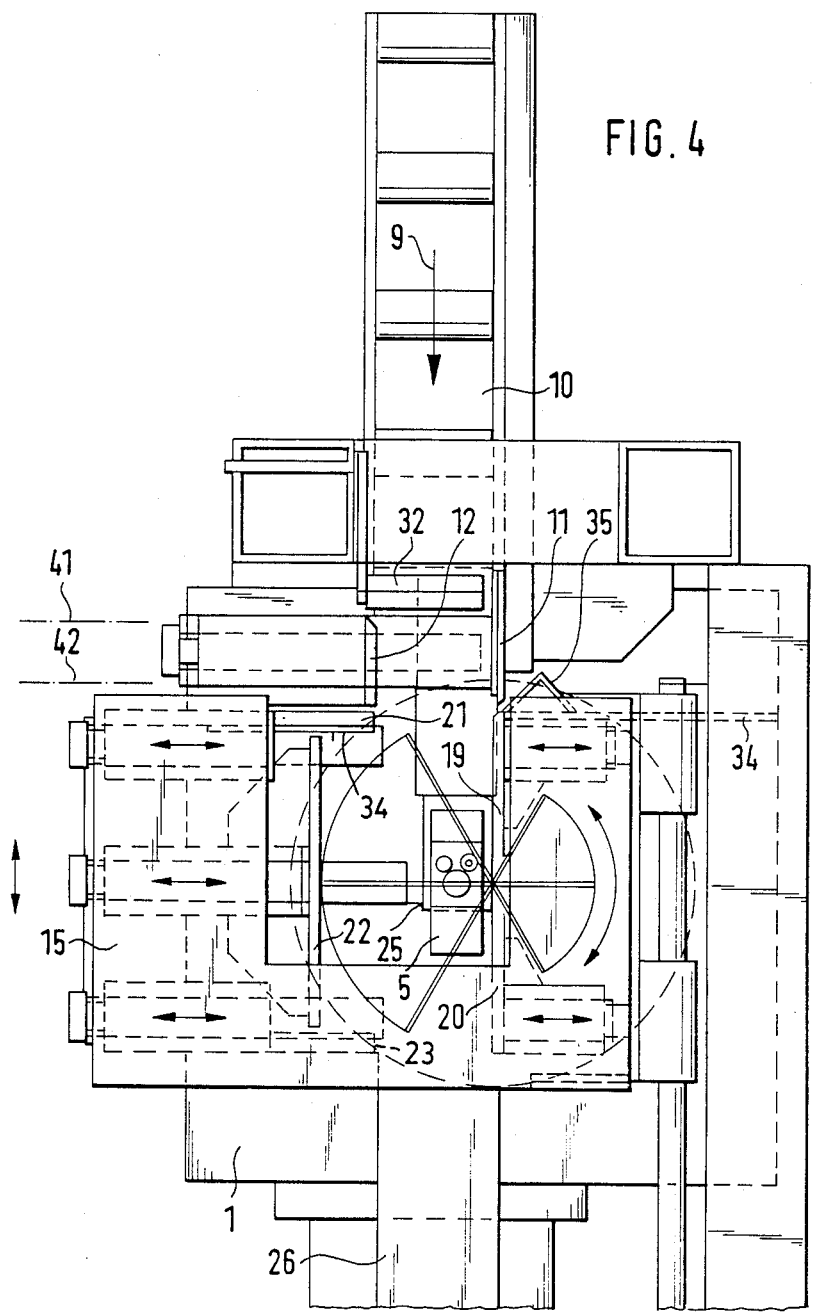
FIG. 4 is a fragmentary plan view of the saw of FIG. 1 in a simplified illustration.

FIG. 4 also shows a guide plate 35, which is located obliquely with respect to the feed direction 9 and which when the bar-like material is being returned to the roller conveyor 10 prevents the material from colliding with the clamping jaw 11, in the event that the bearing jaw 19 is in the open position.

The mode of operation of the machine described in conjunction with FIGS. 1–4 and in particular the function of the apparatus, carried by the clamping carriage 15, for handling bar-like workpiece material will now be described in its essential details in conjunction with FIGS. 5–32. These figures all utilize the same kind of illustration, showing a simplified or schematic plan view of the machine. Also, these figures show the bar-like workpiece material 36 that was not shown in FIGS. 1–4.

Figure 5:
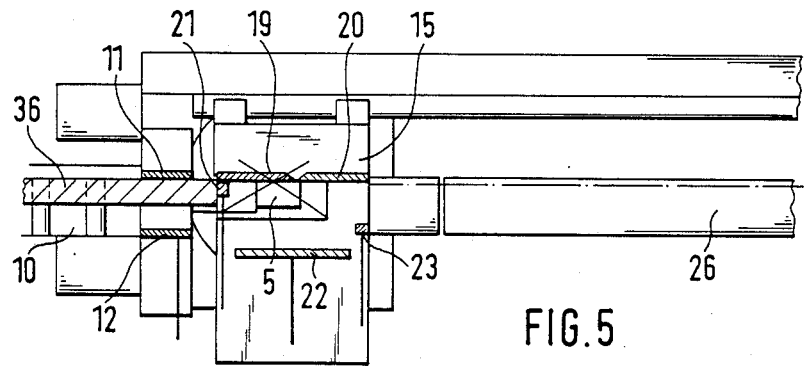
FIGS. 5–32 show various courses of motion of the saw of FIGS. 1–4, shown in plan view and in a uniformly schematic manner.
Figure 6:
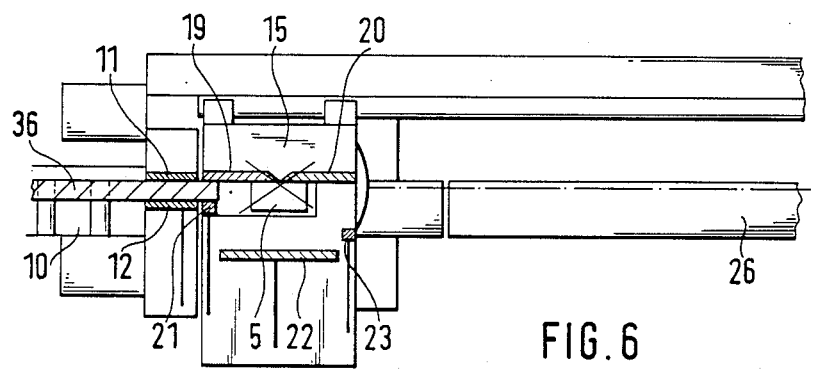
Figure 7:
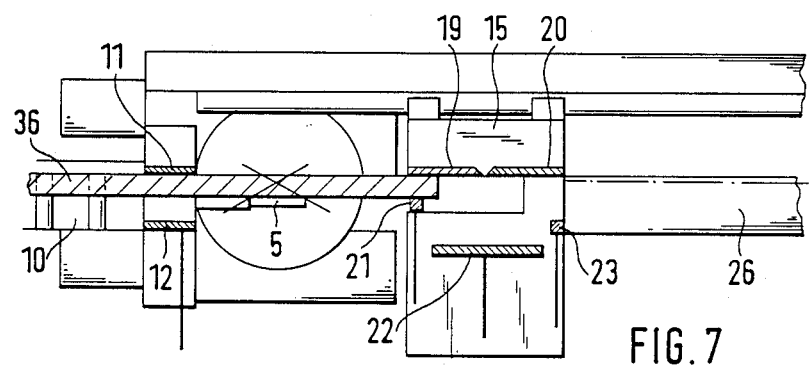

FIGS. 5–7 illustrate the entry of material 36 for which processing is to begin. To this end, as FIG. 5 shows, the bar of material 36 arrives via the roller conveyor 10, with the clamping jaw 12 closed, to meet the clamping jaw 21, which is completely closed; that is, the clamping jaw 21 has moved into contact with the bearing jaw 19. The clamping carriage 15 is positioned at a certain distance from the pair of clamping jaws 11, 12, so that one forward end of the bar material 36 protrudes beyond this pair of clamping jaws. As seen in FIG. 6, this protruding end can then be grasped between the bearing jaw 19 and the clamping jaw 21; to do so, the clamping carriage 15, after the prior opening of the clamping jaw 21, is returned all the way back toward the pair of clamping jaws 11, 12. During this operation shown in FIG. 6, the clamping jaw 12 is closed, to prevent the bar of material 36 from slipping.

Next, as FIG. 7 shows, the clamping jaw 12 is opened again, and the material retained between the bearing jaw 19 and the clamping jaw 21 is pulled forward, by the movement of the clamping carriage 15 in the feed direction 9, by the length that is then to be severed.

During all these operations, the clamping jaws 22 and 23 and the vertical clamping jaw 5 are all in the open position.

Figure 8:
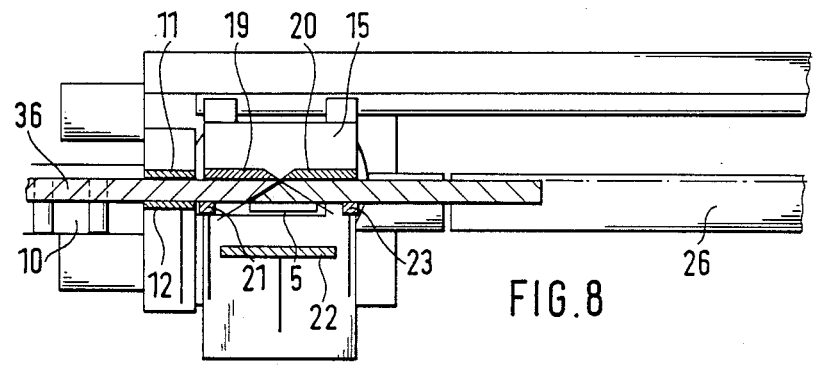
Figure 9:
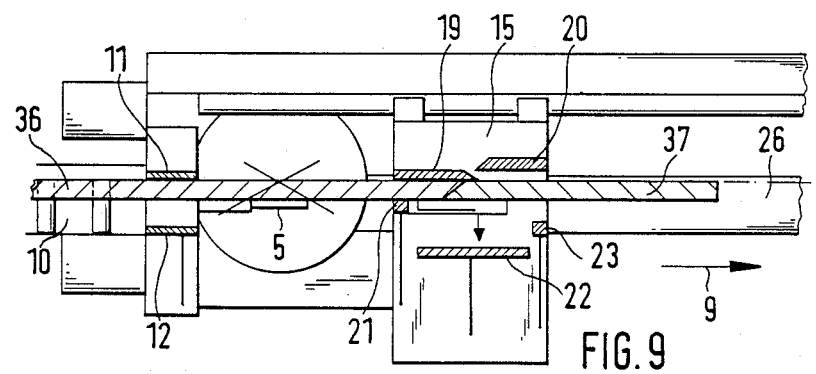
Figure 10:
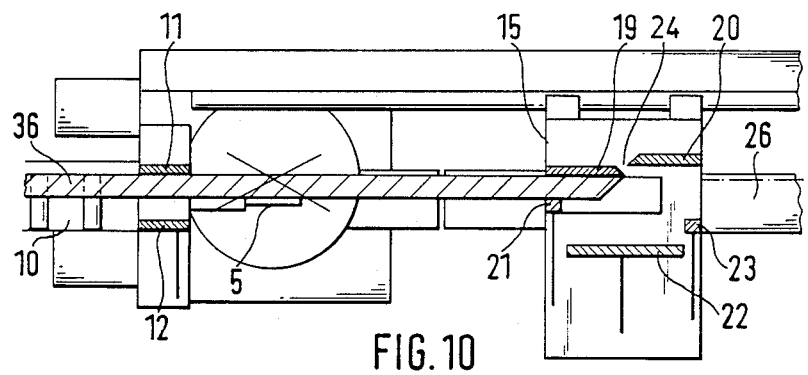

Taking the above as the point of departure, FIGS. 8-10 illustrate the severing of pieces of material for which the disposal route is shorter than the length of the piece of material itself.

For the severing operation, beginning at the state shown in FIG. 7, the clamping jaw 12 is closed again, and the vertical clamping jaw 5 is also switched to the closed position. Also, after the opening of the clamping jaw 21, the clamping carriage 15 is returned to the position shown beside the pair of clamping jaws 11, 12, whereupon the clamping jaws 21 and 23 are then closed, as shown in FIG. 8. The bearing jaws 19 and 20 are in their closing position, so that the severing cut can now be performed.

Next, as shown in FIG. 9, the clamping jaw 12 and the vertical clamping jaw 5 are re-opened, and by the movement of the clamping carriage 15 in the feed direction 9 both the bar material 36 and the severed piece 37 are advanced until the severed piece 37 is located in the desired position on the receiving table 26. Now, as FIG. 9 shows, the bearing jaw 20 and the clamping jaw 23 are then opened, so that the piece 37 can be ejected by tilting the table 26.

After that, the material that is still held between the bearing jaw 19 and the clamping jaw 21 is advanced by the desired length, as shown in FIG. 10. The clamping jaw 12 is then closed, and the clamping carriage 15 returns to the position shown in FIG. 8, for the next severing cut. The cycle begins again from there.

Based on FIGS. 5-7, FIGS. 11-13 illustrate the situation in which the disposal route for a severed piece 38 is longer than the length of this piece itself.

Figure 11:
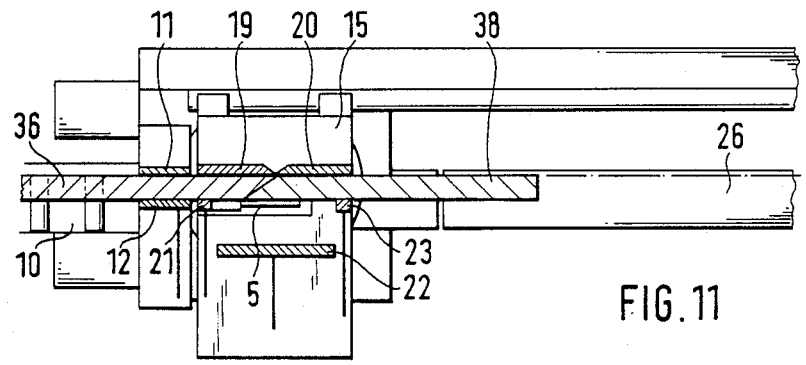

In FIG. 11, the clamping jaw 12 and the vertical clamping jaw 5 have been re-closed, and the material is clamped between the bearing jaws 19, 20 and the clamping jaws 21, 23 for executing the severing cut.

Figure 12:
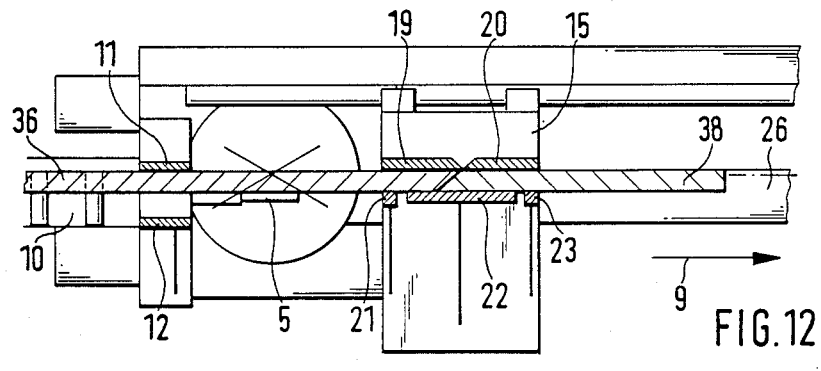
Figure 13:
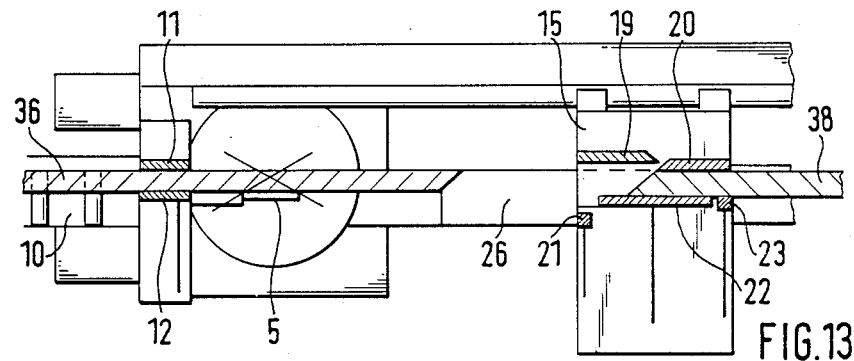

Next, as shown in FIG. 12, the clamping jaw 12 and the vertical bearing jaw 5 are both opened, and the material 36, including the severed piece 38, is now moved in the feed direction 9, with the clamping jaw 22 now in the closed state as well, until the bar material 36 has been advanced by an amount equivalent to the length of the next piece of material to be severed. Then, as shown in FIG. 13, both the clamping jaw 12 and the vertical clamping jaw 5 are closed. Next, once both the bearing jaw 19 and the clamping jaw 21 have been opened, the severed piece of material 38 can be moved to a more-distant position, also shown in FIG. 13. There, the release of the piece 38 is effected by opening of the bearing jaw 20 and the clamping jaws 22 and 23, whereupon the clamping carriage 15 can then be returned to the position shown in FIG. 11 for execution of the next severing cut.

From the operations described above in conjunction with FIGS. 8-10 and 11-13, respectively, it will be appreciated that along the feed path of the bar material, the severed pieces 37 and 38 can be moved either together, or separately from one another, as needed.

Figure 14:
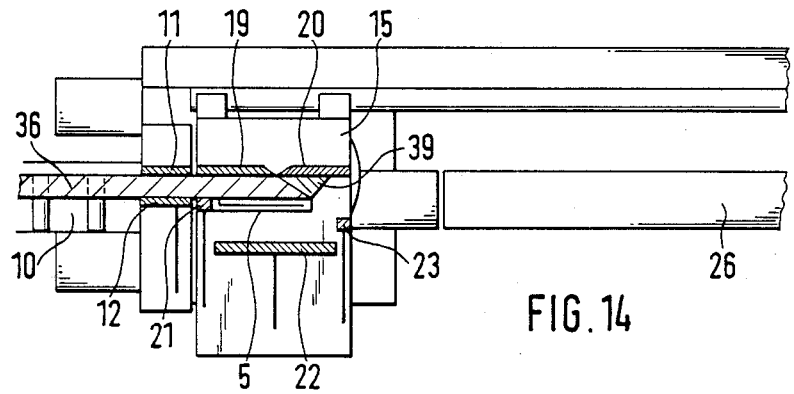
Figure 15:
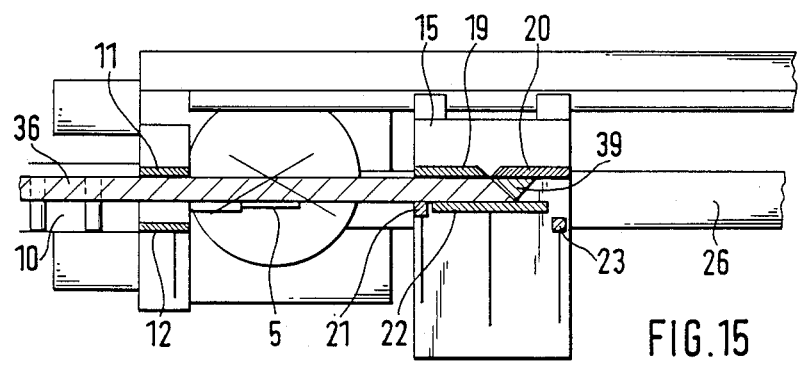
Figure 16:
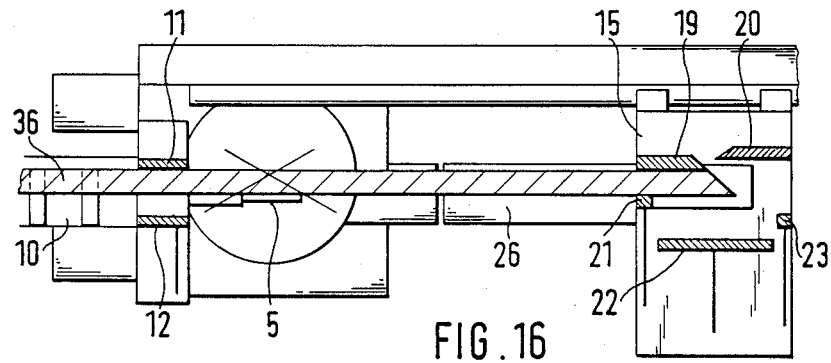

FIGS. 14-16 illustrate the sawing of a short in-between piece 39, such as is produced for instance when the setting of the miter angle is changed. To this end, as shown in FIG. 14, during the cutting not only the clamping jaws 12 and 21 but the vertical clamping jaw 5 are all closed, and the bearing jaws 19 and 20 are in the closing position as well.

After the cut, the clamping jaw 12 and the vertical clamping jaw 5 are opened, as shown in FIG. 15, and with the clamping jaw 22 also closed, the clamping carriage 15 is moved in the feed direction until it reaches the position shown in FIG. 15, where the severed piece 39 can then be ejected by opening both the bearing jaw 20 and the clamping jaw 22. In this position, the clamping carriage 15 then moves onward, as shown in FIG. 16, until the bar of material 36 has been advanced by the length of the next piece of material to be severed.

After the operation shown in FIG. 16, the clamping carriage 15 then returns to the position shown in FIG. 8, for example, so that the next piece of material can be severed.

FIGS. 17-20 show the severing of short pieces of material 40.

Figure 17:
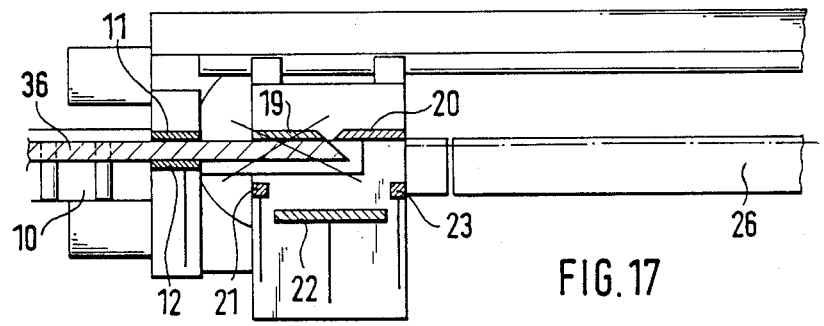
Figure 18:
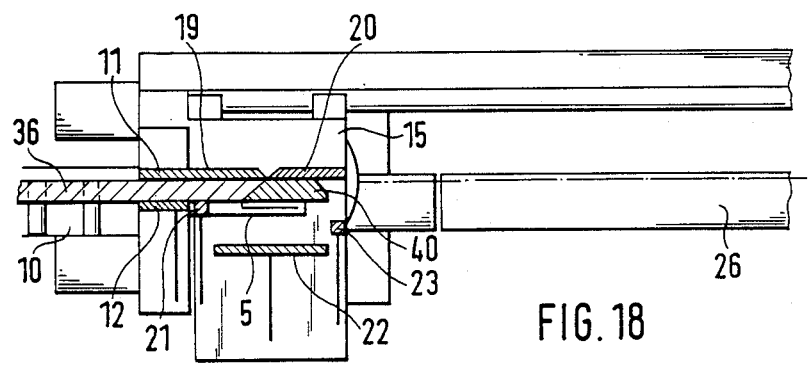

Here, as FIG. 17 shows, the bar material 36 is advanced accordingly, whereupon both the clamping jaw 12 and the vertical clamping jaw 5 are closed, while the clamping jaws 21-23 are open, so that the clamping carriage 15 can be returned to the position shown in FIG. 18, in which the clamping jaw 21 is closed for the execution of the severing cut.

Figure 19:
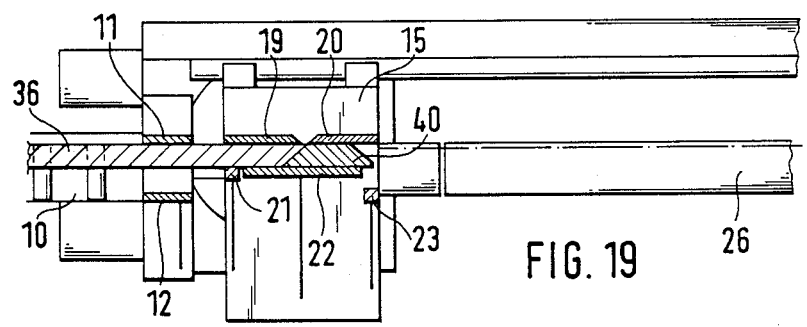

After that, as FIG. 19 shows, the clamping jaws 12 and the vertical clamping jaw 5 are opened, while on the other hand the clamping jaw 22 is additionally closed, so as to retain the piece 40 against the clamping jaws 19, 20.

Figure 20:
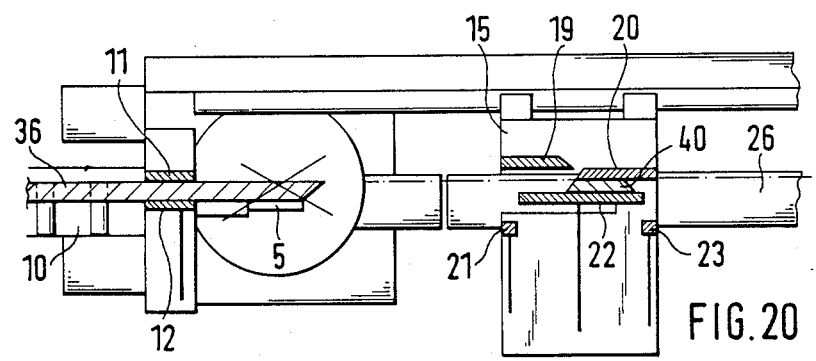

Now, as FIG. 20 shows, the feeding of the next short piece of material is effected first, and then the bar material 36 is firmly retained by closing both the clamping jaw 12 and the vertical clamping jaw 5. Then the bearing jaw 19 and the clamping jaw 21 are opened, and the clamping carriage 15, with the piece of material 40, moves onward into the position shown in FIG. 20, in which finally, by opening the bearing jaw 20 and the clamping jaw 22, the piece of material 40 can be released to the receiving table 26, from which it can be dumped by tilting the table.

The clamping carriage 15 now returns to the position shown in FIG. 18, and the next severing cut is performed.

Optimal utilization of the remaining pieces of bar material 36 will now be described in conjunction with FIGS. 21-27.

Figure 21:
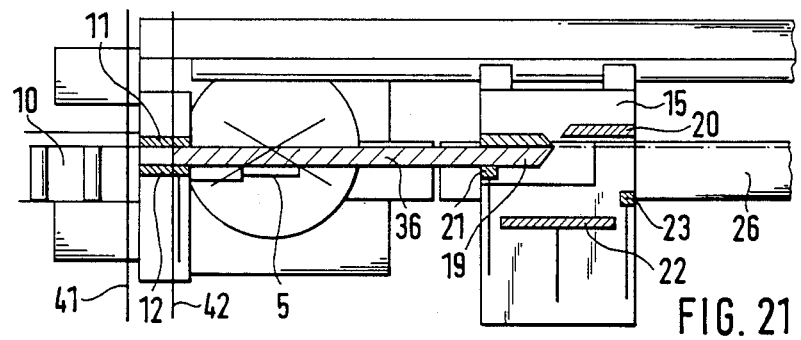
Figure 22:
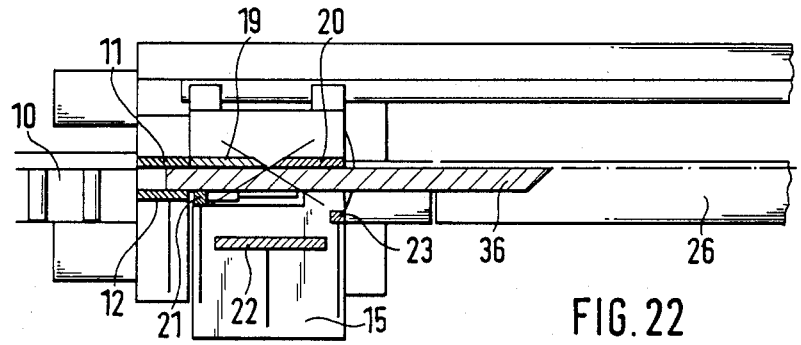

Prior to the situation shown in FIG. 21, the material may have been processed in the manner shown in FIGS. 8-10, by way of example.

Now, however, the end of the bar of material 36 has been reached; this is sensed by suitable sensors, such as the light gates 41 and 42 also visible in FIG. 4. The light gate 41 effects a reduction of the speed of material feeding performed by the clamping carriage 15, so that feeding is stopped once the end of the material reaches the light gate 42.

Using the computer assigned to the machine, it is now ascertained whether the remaining bar material is still long enough for the next piece of material to be severed. If so, and this will be assumed for the purposes of the present example, then the clamping jaw 12 and the vertical clamping jaw 5 are closed, and after the opening of the clamping jaw 21 the clamping carriage is returned to the position shown in FIG. 22, where the clamping jaw 21 is closed once again.

Figure 23:
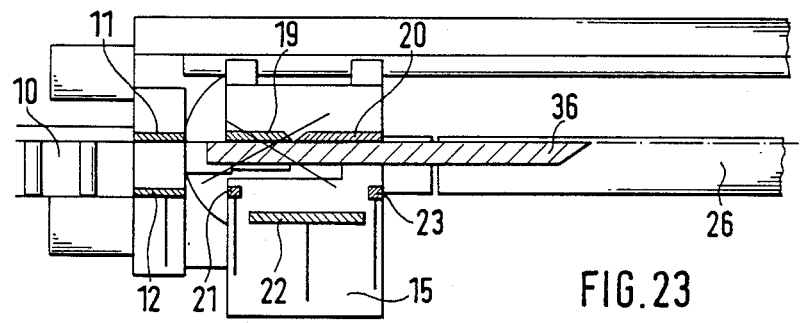
Figure 24:
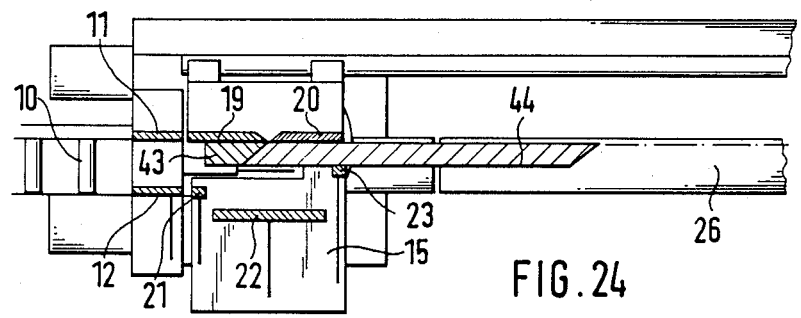

Next, after opening of the clamping jaw 12 and the vertical clamping jaw 5, the material is advanced to the position shown in FIG. 23 for the next severing operation; then the vertical clamping jaw 5 is closed, and the clamping carriage 15, with the clamping jaw 21 now open, is returned to the position shown in FIG. 24, where finally the clamping jaw 23 is also closed for the next severing cut.

In this operation, provision must be made in the machine program so that the clamping jaw 21 cannot collide with the vertical clamping jaw 5.

Figure 25:
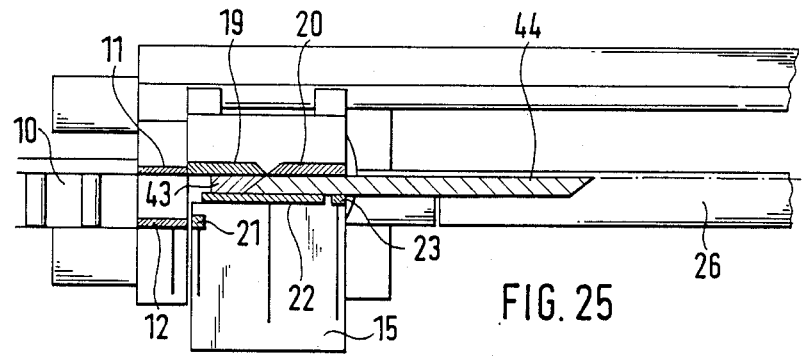
Figure 26:
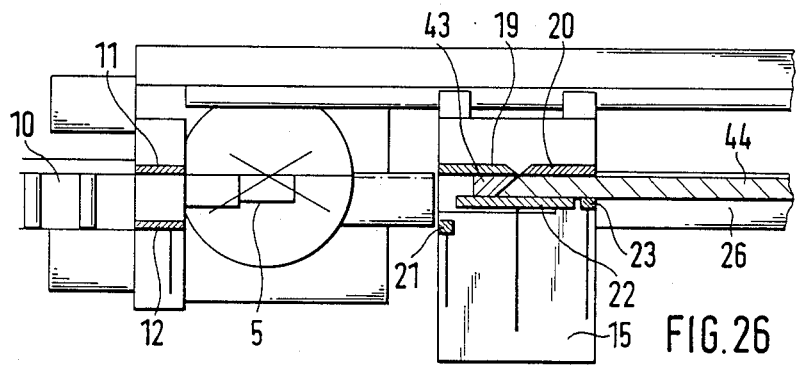
Figure 27:
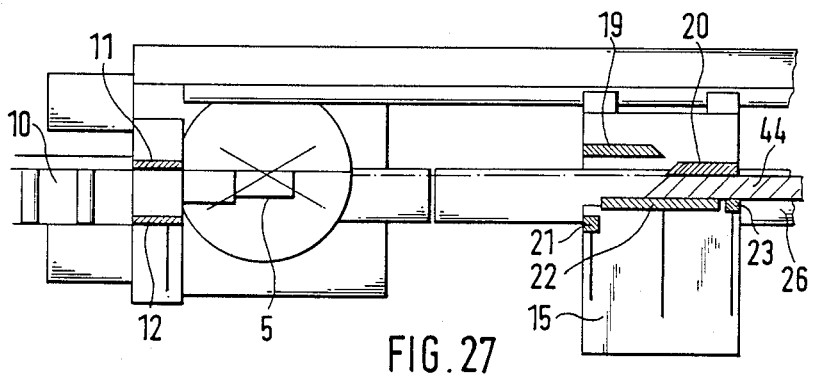

Once the severing cut has been completed in accordance with FIG. 24, the vertical clamping jaw 5 is opened and the clamping jaw 22 closed, as shown in FIG. 25, and the material is now moved into the position shown in FIG. 26, where by opening of the bearing jaw 19 the remaining piece 43 can be dumped via the receiving table 26. After that, the piece of material 44 that has been severed last can be moved to the position shown in FIG. 27 and there ejected.

FIGS. 28-32, finally, show the return of unused bar material 36 after the severing of a final piece of material 45 and after the forward end of the remaining bar material has been cut smooth.

Figure 28:
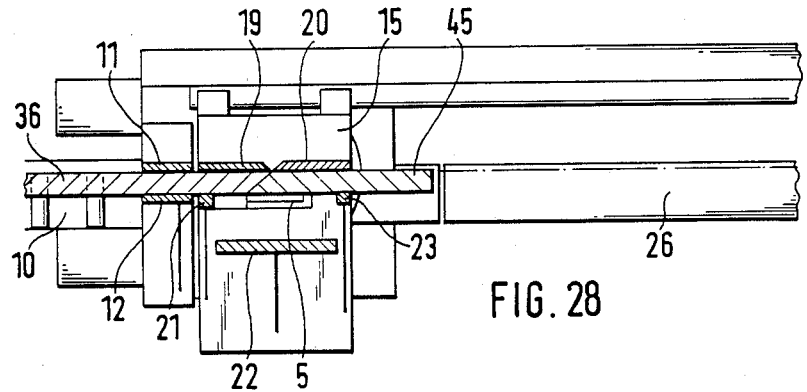

In FIG. 28, with the clamping jaws 12, 21, 23, the vertical clamping jaw 5 and the bearing jaws 19 and 20 all closed, the piece of material 45 is severed.

Figure 29:
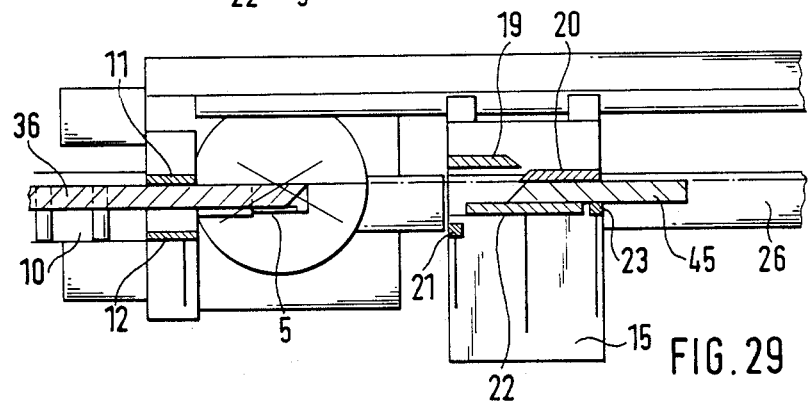

After that, the clamping jaw 12 and the vertical clamping jaw 5 are both opened and the clamping jaw 22 is closed, and the material 36 is advanced somewhat into the position shown in FIG. 29, whereupon, after both the vertical clamping jaw 5 and the clamping jaw 12 have been closed, both the bearing jaw 19 and the clamping jaw 21 are opened, so that with the aid of the clamping carriage 15 the severed piece of material 45 can be moved onward onto the receiving table 26, where finally, by opening of the bearing jaw 20 as well as the clamping jaws 22 and 23, it can be set aside, in the manner already described.

Figure 30:
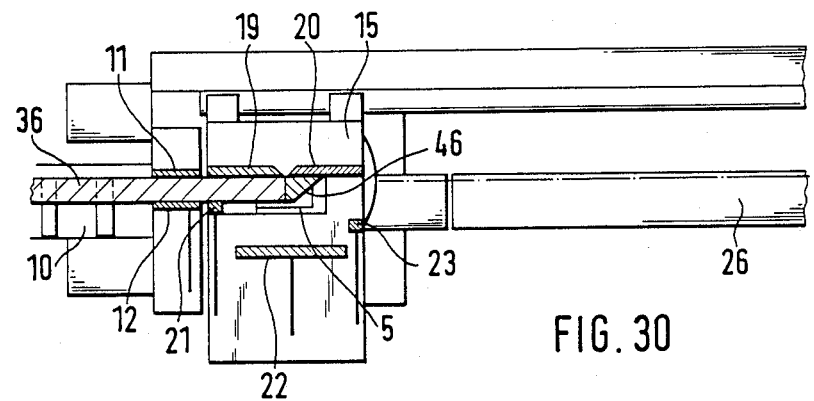

The clamping carriage 15 thereupon returns to the position shown in FIG. 30, and with the clamping jaw 21 now closed and the clamping jaws 22 and 23 opened, but with the bearing jaws 19 and 20 closed, the bar of material 36 is now cut straight, by severing of the piece of material 46.

After opening of the vertical clamping jaw 5, the bearing jaw 19 is now opened and the clamping jaw 22 closed, and the severed piece 46 is disposed of in the manner already described.

Figure 31:
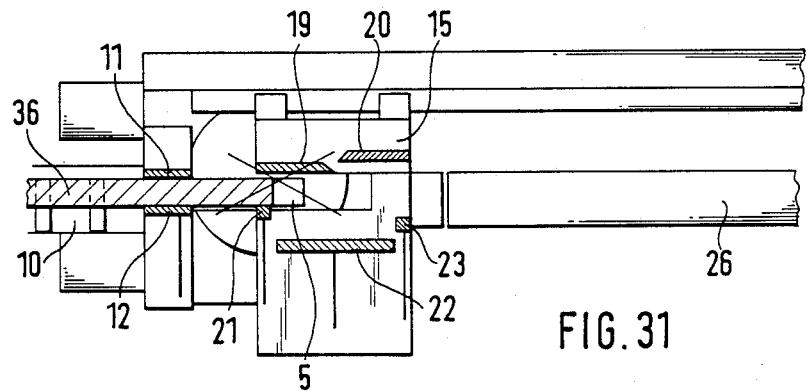
Figure 32:
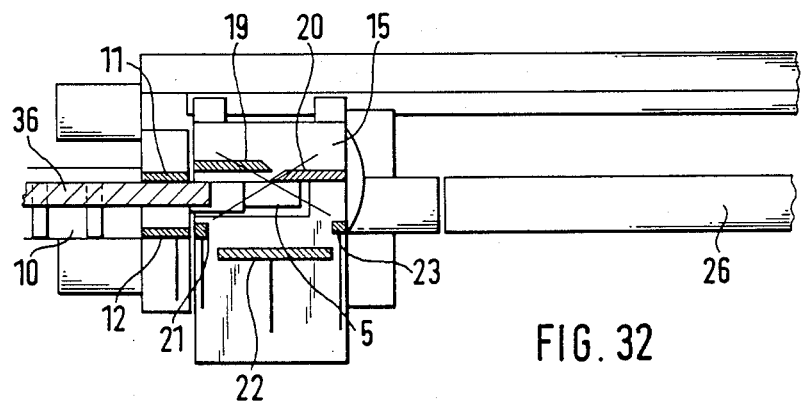

After that, the clamping carriage returns to the position shown in FIG. 31, where the end of the bar of material 36 is grasped between the bearing jaw 19 and the clamping jaw 21. After opening of the clamping jaw 12 in the manner shown in FIG. 32, the bar of material 36 can now be slid backward, counter to the feed direction, onto the roller conveyor 10 by appropriate movement of the clamping carriage and finally removed.

The essential operations that occur have been described above in conjunction with FIGS. 5-32, showing that all the operations that arise can be performed with the aid of the handling apparatus, embodied by the clamping carriage and the clamping means attached to it. Naturally, a great variety of variations and different combinations of the courses of operation are also possible.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An apparatus including a workpiece table and a machine frame for handling bar-like workpiece material in a sawing machine, in particular in a miter-box saw having a miter angle that is adjustable about an axis vertical to said workpiece table relative to a circular cold saw blade rotatable about a horizontal axis, said saw blade being displaceable from below said workpiece table through a pivotable slit in the workpiece table, a first pair of openable and closable clamping jaws immovably disposed on the workpiece feed side of the cutting plane of said saw blade in terms of the feed direction of the material, for retaining said material in place on said workpiece table during cutting and for releasing said material subsequent to being cut, a roller conveyor that precedes said workpiece table for feeding said material to be cut, one of said jaws of said first clamping jaws is disposed stationary in a vertical plane parallel to the material feed direction of the material, a vertically movable clamping jaw disposed on the machine in the vicinity of the cutting plane by means of which the material is clamped against the machine table during cutting, a movable clamping carriage (15) disposed above said workpiece table (2) movable on said machine frame (1) horizontally and parallel to the feed direction (9) of the workpiece material (36), two horizontally openable and closable bearing jaws (19, 20) disposed beside one another in the material feed direction on the clamping carriage and extending in a vertical plane, said bearing jaws (19, 20) are spaced apart by a mutual distance (24) allowing the passage therethrough of said saw blade (4) over an adjustable range of the miter angle (8), in the feed direction of movement of the workpiece material, said bearing jaws being openable and closable in a horizontal direction on the clamping carriage toward said workpiece material, and three movable clamping jaws (21, 22, 23), including two outer jaws and a middle jaw that cooperate with said bearing jaws for gripping said workpiece material, said three clamping jaws all disposed beside one another in the material feed direction, and a mutual spacing distance between said edges oriented toward one another of said two outer clamping jaws (21, 23) dimensioned such that for a largest possible cross section of the workpiece material, these said two outer clamping jaws are located outside a working range of said saw blade when given a maximum miter angle (8).

2. An apparatus as claimed in claim 1, in which said clamping carriage, in order to straddle a vertically movable clamping jaw (5), has a recess (25) open toward a delivery side of the workpiece material, a depth of the recess allowing the displacement of the clamping carriage as far as to the pair of clamping jaws (11, 12).

3. An apparatus as defined by claim 1, in which a vertical axis (7) about which the miter angle (8) is adjustable is disposed in said vertical plane.

4. An apparatus as defined by claim 2, in which a vertical axis (7) about which the miter angle (8) is adjustable is disposed in said vertical plane.

5. An apparatus as defined by claim 1, in which said bearing jaws (19, 20) extend in the feed direction (9) of the workpiece material (36) substantially over an extent of said movable clamping carriage (15) and said bearing jaws are equal in size.

6. An apparatus as defined by claim 2, in which said bearing jaws (19, 20) extend in the feed direction (9) of the workpiece material (36) substantially over an extent of said movable clamping carriage (15) and said bearing jaws are equal in size.

7. An apparatus as defined by claim 3, in which said bearing jaws (19, 20) extend in the feed direction (9) of the workpiece material (36) substantially over an extent of said movable clamping carriage (15) and said bearing jaws are equal in size.

8. An apparatus as defined by claim 1, in which an outer end of each of said outer clamping jaws (21, 23) protrudes beyond a side of said movable clamping carriage (15).

9. An apparatus as defined by claim 2, in which an outer end of each of said outer clamping jaws (21, 23) protrudes beyond a side of said movable clamping carriage (15).

10. An apparatus as defined by claim 1, in which said outer clamping jaws (21, 23) are dimensioned as short compared with a middle clamping jaw, as viewed in the material feed direction (9).

11. An apparatus as defined by claim 2, in which said outer clamping jaws (21, 23) are dimensioned as short compared with a middle clamping jaw, as viewed in the material feed direction (9).

12. An apparatus as defined by claim 8, in which said outer clamping jaws (21, 23) are dimensioned as short compared with a middle clamping jaw, as viewed in the material feed direction (9).

13. An apparatus as defined by claim 1, in which a middle clamping jaw (22) extends substantially over an entire spacing distance between the outer clamping jaws (21, 23).

14. An apparatus as defined by claim 2, in which a middle clamping jaw (22) extends substantially over an entire spacing distance between the outer clamping jaws (21, 23).

15. An apparatus as defined by claim 10, in which a middle clamping jaw (22) extends substantially over an entire spacing distance between the outer clamping jaws (21, 23).

16. An apparatus as defined by claim 1, in which said workpiece table (2) is adjoined by a receiving table (26) disposed downstream thereof in a cutting plane of the workpiece material (36) for receiving severed workpiece material, and said movable clamping carriage (15) is movable substantially over an extent of said receiving table.

17. An apparatus as defined by claim 2, in which said workpiece table (2) is adjoined by a receiving table (26) disposed downstream thereof in a cutting plane of the workpiece material (36) for receiving severed workpiece material, and said movable clamping carriage (15) is movable substantially over an extent of said receiving table.

18. An apparatus as defined by claim 16, in which said receiving table (26) comprises a tilting table that is actuatable in different directions transverse to the material feed direction (9).

19. An apparatus as defined by claim 17, in which said receiving table (26) comprises a tilting table that is actuatable in different directions transverse to the material feed direction (9).

20. An apparatus as defined by claim 1, in which a chip stripper (34) is disposed on the end of the clamping carriage (15) oriented toward the direction of delivery of the material, outside a zone occupied by the workpiece material (36), and is movable into contact with the workpiece table (2).

21. An apparatus as defined by claim 2, in which a chip stripper (34) is disposed on the end of the clamping carriage (15) oriented toward the direction of delivery of the material, outside a zone occupied by the workpiece material (36) and is movable into contact with the workpiece table (2).

22. An apparatus as defined by claim 20, in which a part of the chip stripper (34) is disposed on the side of the clamping carriage (15) that includes said movable clamping jaws (21, 22, 23) and is adjustable with one of said clamping jaws (21).

23. An apparatus as defined by claim 21, in which a part of the chip stripper (34) is disposed on the side of the clamping carriage (15) that includes said movable clamping jaws (21, 22, 23) and is adjustable with one of said clamping jaws (21).

* * * * *